(12) United States Patent
Kurtz et al.

(10) Patent No.: US 10,473,011 B2
(45) Date of Patent: Nov. 12, 2019

(54) PARTICULATE FILTER REGENERATION SYSTEM AND METHOD

(71) Applicant: Ford Global Technologies, LLC, Dearborn, MI (US)

(72) Inventors: Eric Matthew Kurtz, Dearborn, MI (US); Paul Joseph Tennison, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 45 days.

(21) Appl. No.: 15/285,345

(22) Filed: Oct. 4, 2016

(65) Prior Publication Data

US 2018/0094556 A1   Apr. 5, 2018

(51) Int. Cl.
| | |
|---|---|
| *F01N 3/02* | (2006.01) |
| *F01N 3/023* | (2006.01) |
| *F01N 3/027* | (2006.01) |
| *F01N 9/00* | (2006.01) |
| *F02D 41/02* | (2006.01) |
| *F02D 41/14* | (2006.01) |
| *F02D 41/18* | (2006.01) |
| *F01N 3/021* | (2006.01) |

(52) U.S. Cl.
CPC .......... *F01N 3/0238* (2013.01); *F01N 3/021* (2013.01); *F01N 3/027* (2013.01); *F01N 9/002* (2013.01); *F02D 41/029* (2013.01); *F02D 41/1446* (2013.01); *F02D 41/18* (2013.01); *F01N 2430/00* (2013.01); *F01N 2590/11* (2013.01); *F01N 2900/1602* (2013.01); *F02D 41/0225* (2013.01); *F02D 2200/0802* (2013.01); *Y02T 10/47* (2013.01)

(58) Field of Classification Search
CPC .... F01N 2230/02; F01N 3/023; F01N 3/0821; F01N 3/035
USPC .......................................... 60/295, 297, 311
See application file for complete search history.

(56) References Cited

U.S. PATENT DOCUMENTS

| | | |
|---|---|---|
| 6,493,508 B1 | 12/2002 | Roesgen |
| 9,140,627 B2 | 9/2015 | Dudar et al. |
| 2010/0139247 A1* | 6/2010 | Hiemstra ................ F01N 3/027 60/277 |
| 2012/0227379 A1 | 9/2012 | Koestler |
| 2013/0291515 A1 | 11/2013 | Gonze et al. |

* cited by examiner

*Primary Examiner* — Phutthiwat Wongwian
*Assistant Examiner* — Diem T Tran
(74) *Attorney, Agent, or Firm* — Geoffrey Brumbaugh; McCoy Russell LLP

(57) ABSTRACT

Methods and systems are provided for regenerating a particulate filter of a vehicle. In one example, a method may include, during a non-engine operating condition, regenerating a particulate filter coupled in an exhaust system downstream of an engine by activating an electric heater of the particulate filter and directing intake air through the particulate filter, the intake air bypassing the engine, and adjusting an electrical load of the electric heater responsive to one or more of exhaust temperature and intake airflow.

18 Claims, 5 Drawing Sheets

PARTICULATE FILTER REGENERATION SYSTEM AND METHOD

FIELD

The present description relates generally to methods and systems for regenerating a particulate filter coupled in an exhaust system of a vehicle engine.

BACKGROUND/SUMMARY

Particulate filters may reduce the amount of particulate matter emissions (also referred to as soot) released by an engine by trapping the particles in the exhaust system of the engine. Particulate filters are typically regenerated during operation of the engine to decrease the amount of trapped particulate matter. For example, regeneration may be performed by raising the temperature of the filter to a predetermined temperature, and ensuring that the exhaust gas entering the particulate filter is of a certain composition. To achieve this, fuel may be injected into the exhaust stream after a main combustion event. The post-combustion injected fuel is combusted over catalysts placed along the exhaust stream. The heat released during the fuel combustion on the catalysts increases the exhaust temperature, which burns the trapped particles in the filter. However, the above-described approach increases fuel consumption and can result in a higher temperature increase in the exhaust system than desired, which may be detrimental to the exhaust system components, including the particulate filter. Further, because this temperature increase in the exhaust gas is typically above the efficient operating window for exhaust aftertreatment systems, the NOx emissions typically increase during this time because the aftertreatment system is unable to completely reduce the NOx that was formed in-cylinder. Thus, both the emissions and the fuel consumption are increased during regeneration over what occurs during normal operation.

Other attempts to address particulate filter regeneration include utilizing an electrically-operated heater at the particulate filter rather than relying on fuel-based temperature control. One example approach is shown by Gonze et al. in U.S. Patent Application Publication No. 2013/0291515. Therein, an electric heater disposed upstream of a particulate filter is selectively energized during an engine-off condition to heat the particulate filter for regeneration. A pump positioned in the exhaust system is also activated to draw ambient air through the particulate filter during regeneration.

However, the inventors herein have recognized potential issues with such systems. As one example, air flow through the particulate filter during regeneration is controlled only by the displacement of the pump, and conditions of the particulate filter during regeneration are not monitored. As such, this uncontrolled regeneration may lead to overheating at the particulate filter, which may degrade the filter, at least in some examples. In other examples, the uncontrolled regeneration may lead to regeneration events where insufficient heat is provided to the particulate filter to effectively perform the regeneration. Further, by energizing the heater via the vehicle battery or batteries, stored energy needed to start the engine on a subsequent engine start may be compromised and/or complex energy monitoring and supply schemes may be enacted to ensure sufficient charge is available in the batteries prior to initiating the regeneration.

In one example, the issues described above may be addressed by a method including, during a non-engine operating condition, regenerating a particulate filter coupled in an exhaust system downstream of an engine by activating an electric heater of the particulate filter and directing intake air through the particulate filter, the intake air bypassing the engine, and adjusting an electrical load of the electric heater responsive to one or more of exhaust temperature and intake airflow.

In this way, the air flow provided to the particulate filter during the regeneration may be drawn in through the intake system of the engine and to the exhaust system, bypassing the engine. By doing so, the air may flow past various sensors, such as an intake mass air flow sensor, an exhaust temperature sensor, and/or other sensors. Using the output from the sensors, the electrical load of the electric heater may be adjusted to maintain a target particulate filter temperature during the regeneration. Additionally, the output from the sensors may be used to modulate the air flow provided to the particulate filter to maintain temperature for a given heater electrical current. Thus, the electric heater may be used to perform the regeneration while still relying on various engine sensors to control the regeneration, thereby lowering fuel consumption and avoiding uncontrolled regeneration of the particulate filter. Further, at least in some examples, the electric heater may be supplied energy from a remote power source, such as a power grid, rather than the vehicle battery, and thus regeneration may occur without regard for vehicle battery state of charge.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
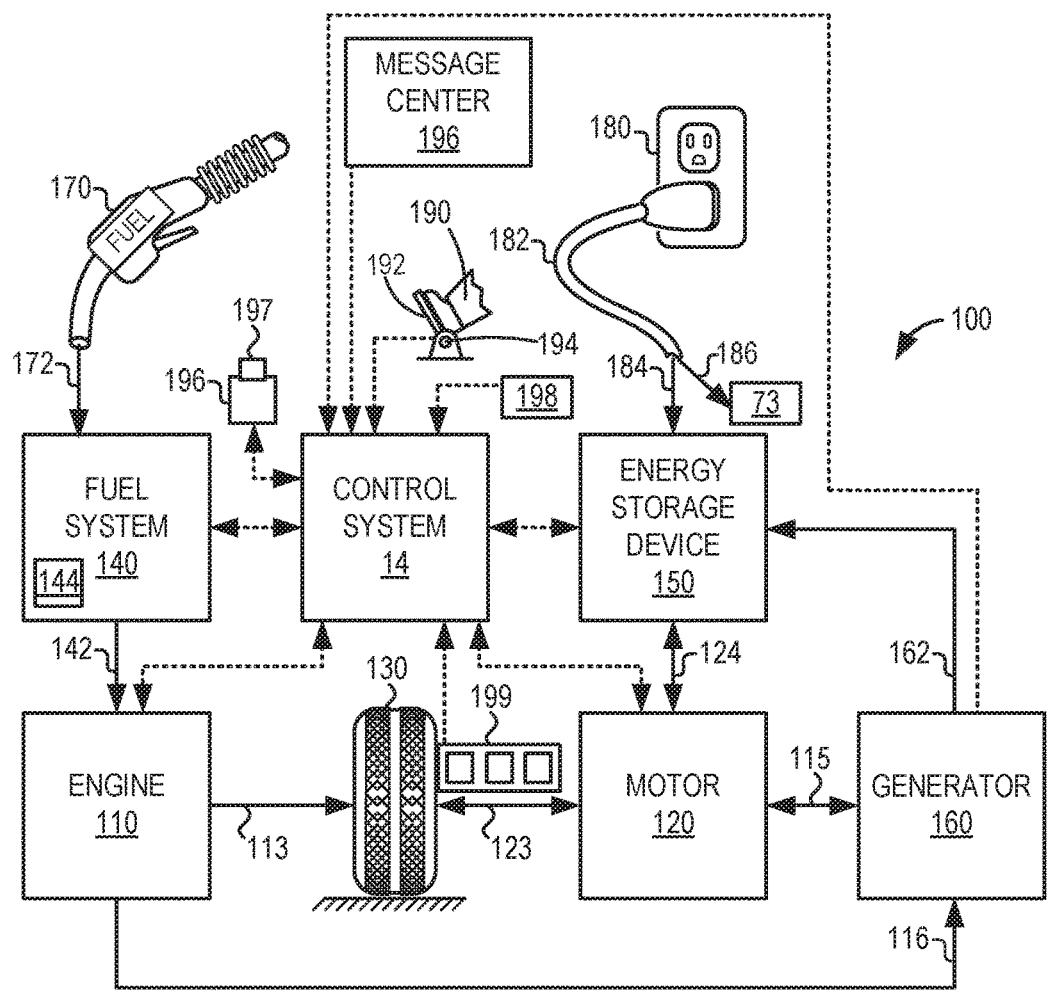
FIG. 1 illustrates an example vehicle propulsion system.

The following description relates to systems and methods for regenerating a particulate filter coupled in an exhaust system of an engine. The particulate filter may be regenerated according to an engine-off regeneration routine, which may be carried out when the engine is off and the vehicle is not moving. During the engine-off regeneration routine, the particulate filter may be regenerated by activating an electric heater to heat the particulate filter to a target temperature, and during the regeneration intake air (e.g., fresh air drawn in through the intake system of the vehicle) may be directed to the filter by activating an air flow device, such as a pump, and adjusting the position of various engine system valves to allow the air in the intake system to flow to the particulate filter without traveling through the engine. Further, output from various engine system sensors, such as an intake air mass flow sensor and exhaust temperature sensor, may be used to determine the target temperature of the particulate filter and the electrical load of the electric heater may be adjusted to maintain the target temperature.

In contrast, during an engine-on regeneration routine, which may be carried out only when the particulate load on the particulate filter exceeds a threshold load and the engine is running, the particulate filter may be regenerated by supplying rich exhaust gas and/or excess exhaust heat to the exhaust system, where the fuel in the exhaust gas is combusted to generate heat for carrying out the regeneration. The rich exhaust gas and additional exhaust heat may be generated by throttling the engine and/or adjusting fuel injection timing.

The particulate filter may be regenerated according to the engine-off regeneration routine during virtually any condition where the engine is off and the vehicle is not moving. For example, the particulate filter may be regenerated according to the engine-off regeneration routine even when the load on the particulate filter is not above a threshold load that typically would trigger regeneration during engine operating conditions. By selectively regenerating the particulate filter using an electric heater (and only regenerating the particulate filter according to the engine-on regeneration routine when engine-off regeneration routine cannot be carried out, such as when the engine is running), fuel consumption may be reduced and the particulate filter may be maintained at relatively low particulate load during engine operation. Additionally, by adjusting the engine system valves so that the air supplied to the filter during regeneration originates at the intake system (rather than just drawing in ambient air at the pump, for example), various parameters of the regeneration may be measured, such as the air mass flow through the filter, temperature of the filter, etc., and the regeneration may be controlled based on the measured parameters. In this way, the regeneration may be performed at sufficient heat to effectively burn off the stored particulate matter while maintaining the particulate filter temperature below an upper limit at which degradation to the particulate filter may occur.

In one example, the electric heater used to heat the particulate filter during regeneration may be supplied energy from a remote power source such as a power grid (e.g., by plugging the heater in to an appropriate electrical outlet). By avoiding reliance on the vehicle battery system to power the heater, the regeneration can be performed any time the vehicle is parked and plugged in, and monitoring of battery state of charge and/or inadvertently draining the vehicle battery may be avoided. Additionally, when the vehicle in which the particulate filter is installed is a plug-in hybrid electric vehicle, the power supply to the heater may be a shared power supply with the power supply to the vehicle battery, thus enabling user convenience by taking advantage of the fact that the vehicle is already plugged in during battery charging and allowing the heater to be activated and regeneration to occur at that time.

Figure 2:
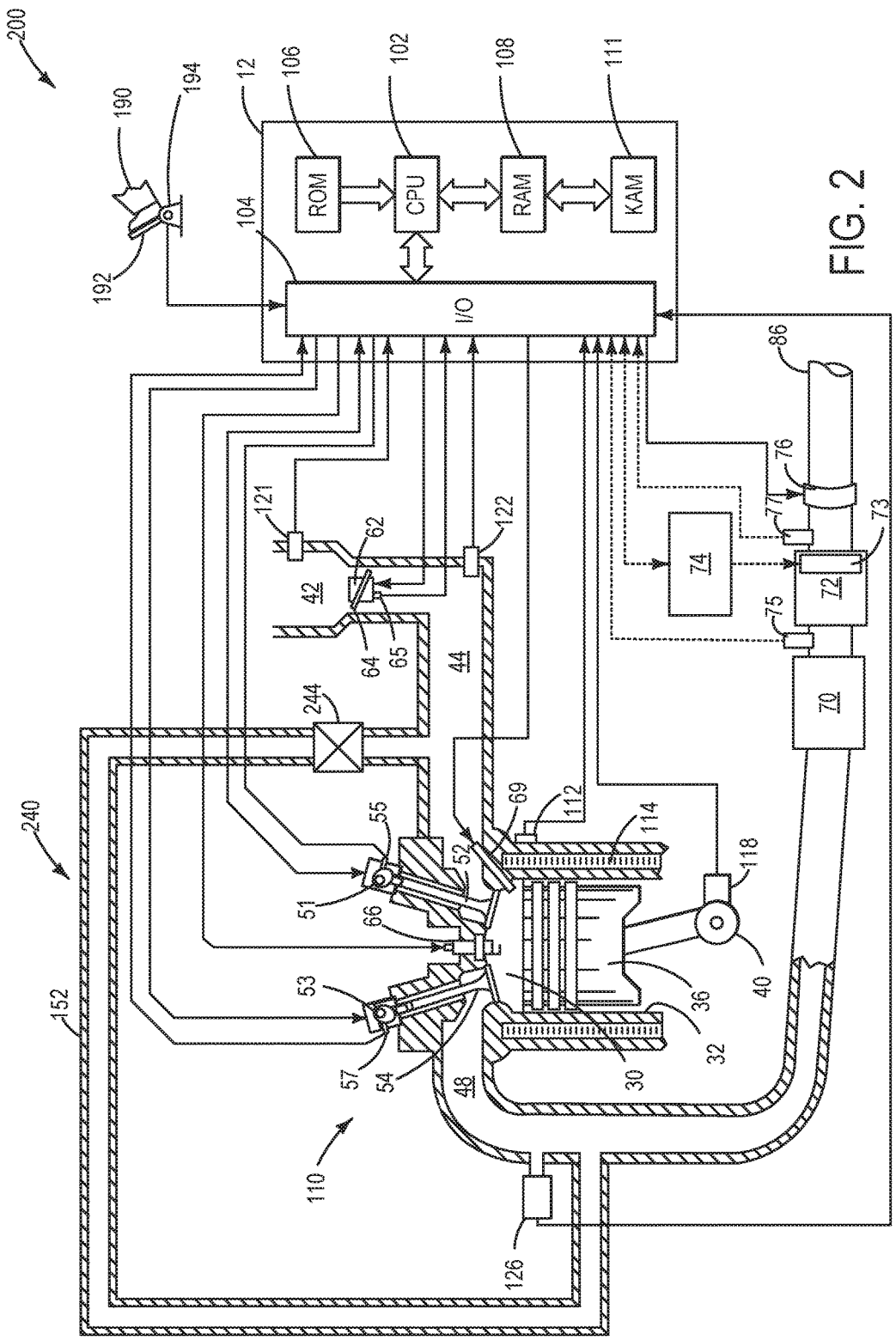
FIG. 2 illustrates an example engine that may be included as part of the vehicle propulsion system of FIG. 1.
Figure 3:
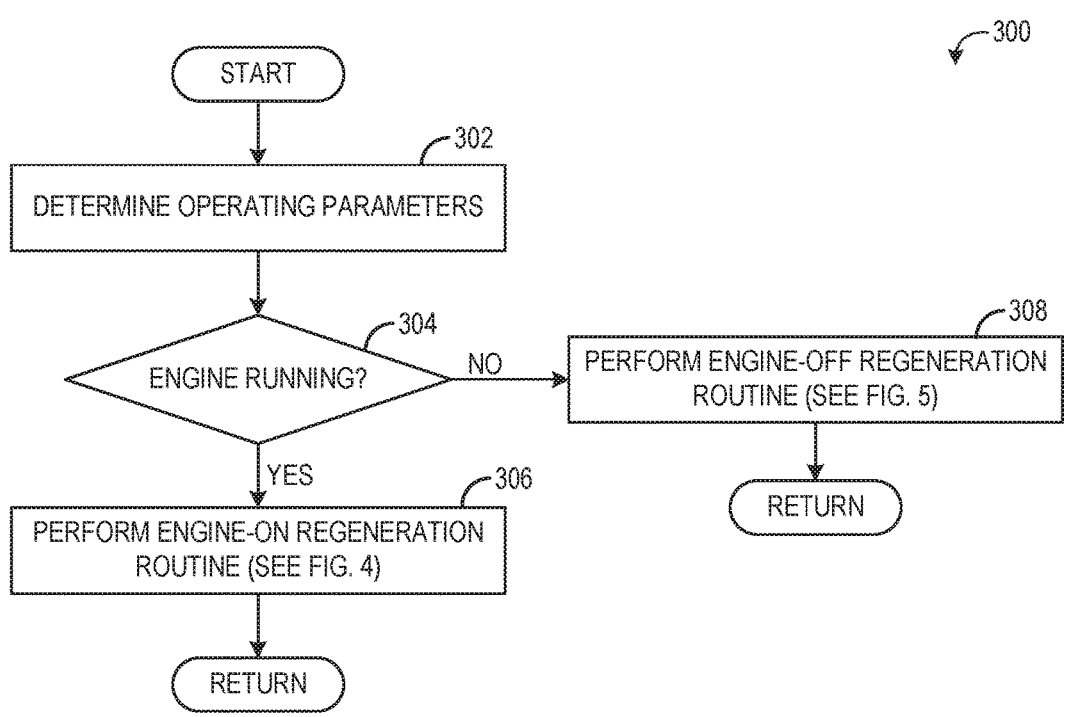
FIG. 3 is a high-level flow chart illustrating an example method for determining a regeneration routine.

Accordingly, in one example, the particulate filter regeneration described above may be performed with a particulate filter installed in a suitable vehicle propulsion system, such as a plug-in hybrid electric vehicle propulsion system, such as shown in FIG. 1. However, in other examples the particulate filter may be installed in a hybrid vehicle or a standard, engine-driven only vehicle. The engine installed in the vehicle propulsion system may be a diesel engine in one example, or the engine may be a gasoline engine or multi-fuel engine. An example engine including an exhaust system housing the particulate filter is shown in FIG. 2. The vehicle propulsion system and engine of FIGS. 1-2 may be controlled by a control unit. The control unit may include stored instructions executable to perform various particulate filter regeneration routines, as shown in FIG. 3, including an engine-on routine illustrated in FIG. 4 and an engine-off routine illustrated in FIG. 5.

Turning now to FIG. 1, it illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV) or simply a hybrid vehicle.

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 123 while engine 110 is deactivated. Herein, the engine may be shut down to rest while the motor propels vehicle motion.

During other operating conditions, engine 110 may be set to a deactivated state (as described above) while motor 120 may be operated to charge energy storage device 150. For example, motor 120 may receive wheel torque from drive wheel 130 as indicated by arrow 123 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 113 while motor 120 is deactivated. During other operating conditions, both engine 110 and motor 120 may each be operated to propel the vehicle via drive wheel 130 as indicated by arrows 113 and 123, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 123. For example, during select operating conditions, engine 110 may drive generator 160, which may in turn supply electrical energy to one or more of motor 120 as indicated by arrow 115 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Thus, liquid fuel may be supplied from fuel tank 144 to engine 110 of the motor vehicle shown in FIG. 1. Still other suitable fuels or fuel blends may be supplied to engine 110, where they may be combusted at the engine to produce an engine output. The engine output may be utilized to propel the vehicle as indicated by arrow 113 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 14 may communicate with one or more of engine 110, motor 120, fuel system 140, energy storage device 150, and generator 160. Control system 14 may receive sensory feedback information from one or more of engine 110, motor 120, fuel system 140, energy storage device 150, and generator 160. Further, control system 14 may send control signals to one or more of engine 110, motor 120, fuel system 140, energy storage device 150, and generator 160 responsive to this sensory feedback. Control system 14 may receive an indication of an operator requested output of the vehicle propulsion system from a vehicle operator 190. For example, control system 14 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 (e.g., a power grid) via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 14 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Further, as explained in more detail below, a particulate filter heater 73 may also receive electrical energy from power source 180. The particulate filter heater 73 may receive electrical energy from power source 180 via electrical transmission cable 182, as shown by arrow 186. In other examples, the particulate filter heater 73 may receive electrical energy from power source 180 via another transmission cable, or it may receive electrical energy wirelessly. In a still further example, the particulate filter heater 73 may receive electrical energy via energy storage device 150.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 14 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 14. In one example, the control system may adjust engine output and/or the wheel brakes to increase vehicle stability in response to sensor(s) 199.

FIG. 2 is a schematic diagram showing one cylinder of a multi-cylinder engine 110 in an engine system 200, which may be included in a propulsion system of an automobile, such as in propulsion system 100 of FIG. 1. The engine 110 may be controlled at least partially by the control system 14 including a controller 12 and by input from the vehicle operator 190 via an input device. In this example, the input device includes an accelerator pedal 192 and a pedal position sensor 194 for generating a proportional pedal position signal. A combustion chamber 30 of the engine 110 includes a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel (e.g., wheel 130) of the vehicle via an intermediate transmission system. Further, a starter motor may be coupled to the crankshaft 40 via a flywheel to enable a starting operation of the engine 110.

The combustion chamber 30 may receive intake air from an intake manifold 44 via an intake passage 42 and may exhaust combustion gases via an exhaust passage (e.g., exhaust pipe) 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber (as shown) or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 121 and a manifold air pressure sensor 122 for sensing an amount of air entering engine 110.

An exhaust gas sensor 126 is shown coupled to the exhaust passage 48 upstream of both an exhaust gas recirculation system 240 and an emission control device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is UEGO configured to provide output, such as a voltage signal, that is proportional to the amount of oxygen present in the exhaust. Controller 12 converts oxygen sensor output into exhaust gas air-fuel ratio via an oxygen sensor transfer function.

An exhaust gas recirculation (EGR) system 240 may route a desired portion of exhaust gas from the exhaust passage 48 to the intake manifold 44 via an EGR passage 152. The amount of EGR provided to the intake manifold 44 may be varied by the controller 12 via an EGR valve 244. Under some conditions, the EGR system 240 may be used to regulate the temperature of the air-fuel mixture within the combustion chamber, thus providing a method of controlling the timing of ignition during some combustion modes.

The emission control device 70 is shown arranged along the exhaust passage 48 downstream of the exhaust gas sensor 126. The device 70 may be a three way catalyst (TWC), $NO_x$ trap, various other emission control devices, or combinations thereof. In some examples, during operation of the engine 10, the emission control device 70 may be periodically reset by operating at least one cylinder of the engine within a particular air-fuel ratio.

A particulate filter 72 is shown arranged along the exhaust passage 48 downstream of the emission control device 70. Exhaust gas treated by emission control device 70 and particulate filter 72 is released into the atmosphere through tailpipe 86. The particulate filter 72 may be a diesel particulate filter or a gasoline particulate filter. A substrate of the particulate filter 72 may be made of ceramic, silicon, metal, paper, or combinations thereof. During operation of the engine 10, particulate filter 72 may capture exhaust particulate matter (PMs), such as ash and soot (e.g., from incompletely-combusted hydrocarbons) in order to reduce vehicle emissions. The soot may clog the surfaces of the particulate filter, thereby creating an exhaust backpressure. The exhaust backpressure may negatively influence the engine performance. Once the particulate filter 72 becomes fully loaded with soot (e.g., soot load on the particulate filter exceeds a soot load threshold), the backpressure may be too high for proper exhaust expulsion. Work used to expel exhaust from the engine 10 increases in order to overcome the backpressure described above. In order to avoid high backpressure, the engine 110 may periodically regenerate the filter, as described in more detail below.

Passive regeneration may occur when an engine load exceeds a threshold load causing an exhaust temperature to rise. As the exhaust temperature increases beyond a threshold temperature (e.g., 450° C.), the soot on the particulate filter 72 may combust. Therefore, passive regeneration occurs without alterations to engine operations. Conversely, engine-running active regeneration occurs via the controller 12 signaling for alterations to engine operations in order to increase exhaust temperatures (e.g., late injection, secondary injection, throttling, exhaust recirculation, spark retard, and/or a decrease in air/fuel ratio) independent of the engine load. For example, the controller may send signals to a fuel injector to increase the pulse-width of the fuel injection, and enrich the combustion air-fuel ratio (relative to stoichiometry). As another example, the controller may send signals to an electromechanical actuator coupled to the intake throttle to move the throttle valve towards a more open position, thereby increasing airflow to the engine. In still other examples, valve timing may be adjusted (e.g., via cam adjustments) to increase positive valve overlap.

As described previously, fuel-based regeneration schemes, such as the passive and active regenerations described above, may degrade fuel economy. Further, while passive regeneration relies on relatively high exhaust heat that is generated without intrusive excursions, and thus may impose less of a fuel penalty, passive regenerations may occur infrequently depending on the configuration of the engine (e.g., diesel engines may not generate exhaust of high enough temperatures to perform passive regenerations) and the vehicle drive cycle (e.g., infrequent vehicle operation where the operation is at light load may not support adequate passive particulate filter regeneration). Thus, particulate filter 72 may be coupled to or in proximity to a particulate filter heater 73. For example, the particulate filter heater 73 may be positioned at a front face of the particulate filter 72, be embedded in the particulate filter 72, or other suitable position. The particulate filter heater 73 may be activated in order to regenerate the particulate filter 72 during non-engine running conditions (e.g., when the engine is off and the vehicle is not moving).

The particulate filter heater 73 (also referred to herein as the heater 73) may be controlled by a heater controller 74. The heater controller 74 may be operably (e.g., communicatively) coupled to the vehicle/engine controller 12 and may include electronic storage medium for executable programs, and may be programmed with computer readable data representing non-transitory instructions executable by the heater controller for selectively coupling the heater 73 to a power source (e.g., power source 180 of FIG. 1) to energize/activate the heater in response to a command from the controller 12 to initiate particulate filter regeneration, for example. Further, the heater controller 74 may receive information from controller 12 usable to control the electrical load of the heater 73, as will be explained in more detail below. For example, the heater controller 74 may determine a target particulate filter temperature responsive to information received from the controller 12 (e.g., intake air mass flow, particulate matter load, exhaust temperature) and adjust the electrical load to maintain the particulate filter at the target temperature.

The exhaust system further includes an air flow device 76, such as a pump, fan, or other device configured to draw air through the particulate filter 72. In one example, the device 76, which may be activated in response to a command from the controller 12, may be positioned to draw gas from the exhaust system, through the particulate filter 72, and out the tailpipe. In some examples, the device may be positioned in the exhaust pipe itself (as illustrated), while in other examples the device may be positioned in a bypass or auxiliary passage coupled to the exhaust pipe. Due to the inclusion of the exhaust gas recirculation (EGR) system 240, when the EGR valve 244 is open, the device may draw air from the intake system, through the EGR system, and to the particulate filter. In other examples, the device may be positioned in the intake system (e.g., in intake passage 42), where the device may be configured to push air through the system. In still further examples, the device may be removably coupled to the vehicle system and may be positioned at the tailpipe by an operator prior to performing a particulate filter regeneration.

In some examples, an electrically-assisted charge device may be coupled in the engine system. The electrically-assisted charge device may include an electrically-assisted turbocharger (e.g., a turbine positioned in the exhaust system and coupled to a compressor positioned in the intake system via a shaft, with an electrically-driven motor to rotate the shaft during certain conditions), an electrically-assisted compressor, or other suitable device that may be activated to pump air through the engine system responsive to an indication to regenerate the particulate filter. For example, the electrically-assisted charge device may be activated to rotate a compressor in the intake system, thus drawing in fresh air to the intake system, around the engine, and to the exhaust system and particulate filter.

The controller 12 is shown in FIG. 2 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 111, and a data bus. The controller 12 may receive various signals from sensors coupled to the engine 110, in addition to those signals previously discussed, including measurement of inducted mass air flow (MAF) from the mass air flow sensor 121; engine coolant temperature (ECT) from a temperature sensor 112 coupled to a cooling sleeve 114; an upstream filter parameter sensor 75 (which may measure one or more of exhaust temperature, pressure, and oxygen concentration); a downstream filter parameter sensor 77 (which may measure one or more of exhaust temperature, pressure, and oxygen concentration); an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

The controller 12 receives signals from the various sensors of FIGS. 1 and 2 and employs the various actuators of FIGS. 1 and 2 to adjust engine operation based on the received signals and instructions stored on a memory of the controller 12. In one example, the controller 12 may receive a signal indicative of intake air mass flow from MAF sensor 121. During engine operation, the controller 12 may adjust a fuel injection amount of injector 69 responsive to the measured intake air mass flow. During non-engine operation when particulate filter 72 is being regenerated, controller 12 may send information indicative of intake air mass flow determined from MAF sensor 121 to the heater controller 74, and the heater controller 74 may adjust the electrical load of the heater 73 in response to the received mass air flow. Further, the controller 12 may receive a signal indicative of exhaust temperature (from the upstream sensor 75 and/or downstream sensor 77) adjust a pump/fan speed of the air flow device 76 responsive to the measured exhaust temperature.

Thus, the systems presented in FIGS. 1 and 2 provide for a particulate filter with a heater element integrated into the filter system either in the substrate or at the inlet to the filter. The heater element may include an access location that may be configured to be hooked up to an electrical line used to feed the heater element with electrical energy when the vehicle is parked. The access location may be located at the filter or somewhere else on the vehicle, with a permanent electrical connection between the filter and that location. Additionally, in some examples, various components of the engine system, such as the controller 12, may also be connectable to the electrical line in order to supply energy to the controller, sensors, and actuators discussed herein during a particulate filter regeneration. The system further includes a controller for the heater element and an exhaust device that can pull air out of the tailpipe to provide continuous flow of air through the filter while the filter regenerates. The device could either be part of the exhaust system or be connected to the exhaust system externally. Exhaust air leaving the tailpipe or exhaust device may be vented directly out of the tailpipe or ducted out of a building. An I/O connection between the exhaust device, the engine controller, and the heater element controller may be present to coordinate actions of each element during offline filter regeneration.

The I/O connection may command the engine controller to open the intake throttle, the EGR valve, and if present an EGR cooler bypass to allow air flow through the engine air path, bypassing the engine itself. Fresh ambient air would be pulled by the exhaust device through the air filter, be measured by the MAF sensor and then proceed through a compressor (if the engine includes a turbocharger), through the EGR system, past the turbine (if present) and through the exhaust system travelling through the particulate filter.

Some engine configurations include both high-pressure EGR (HP-EGR) where the EGR passage is coupled between the engine and the turbine on the exhaust side, and between the compressor and the engine on the intake side, and low-pressure EGR (LP-EGR) where the EGR passage is coupled between the turbine and atmosphere on the exhaust side, and between the atmosphere and the compressor the intake side. In such examples, the HP-EGR valve would be opened while the LP-EGR valve is commanded shut to prevent short circuiting of air. Alternatively, the LP-EGR valve could be controlled to provide some flow of hot gases to reduce the air heating requirement.

The heater controller may control the electrical load to the heater element to control the temperature of the air in the particulate filter, with the temperature being measured by existing temperature sensors. The electrical load may be pre-controlled based on ambient air temperature and pressure, air flow measured by the MAF sensor, and by the initial soot load on the filter (the value of which may be stored in the engine controller). The heater element may continue to heat the PF and the exhaust device may continue to flow air until the pressure drop across the PF (normalized for air flow) or normalized "restriction" reaches a target value or the operation is terminated by the operator (e.g., the vehicle is unplugged for customer usage). Alternatively, heating could occur for a predetermined amount of time responsive to ambient conditions. In yet another embodiment, the heating could occur until there was no longer sufficient carbon burn in the PF as indicated by temperature increase over the filter. Once the heating duration criteria is met, the heater element may be shut off. After the system temperature drops below a target level, the exhaust device would shut off and the engine actuators that were changed would return to their normal state.

The upstream and downstream exhaust O2 sensors and temperature sensors may be used to ensure that air is flowing in the correct direction and at the correct conditions. If the O2 reading is too low or the downstream temperature is too high, the PF regeneration process would be stopped and a notification may be displayed at a user interface. In another example, the upstream and downstream exhaust O2 sensors may be used to determine if the particulate filter regeneration is complete. For example, if the output from the downstream O2 sensor is within a threshold range of the output of the upstream O2 sensor (e.g., if each sensor measures the same or relatively same oxygen concentration), it may indicate that the particulate filter is no longer combusting soot and hence that regeneration is complete.

FIG. 3 is high-level flow chart illustrating a method 300 for determining whether to execute an engine running or a non-engine running regeneration routine. Instructions for carrying out method 300 and the rest of the methods included herein may be executed by a controller (e.g., controller 12) based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below. Further, at least some of the methods described herein (e.g., method 500 of FIG. 5) may be executed partially by heater controller 74 based on instructions stored in memory of the heater controller.

At 302, method 300 includes determining engine operating conditions. The determined conditions may include, but are not limited to, vehicle operating status (e.g., whether a key or other ignition starter is in an on position), engine operating status (e.g., whether combustion is occurring in the engine), vehicle drive status (e.g., transmission gear, vehicle speed, vehicle propulsion mechanism), particulate filter soot load, and other conditions.

At 304, method 300 determines if the engine is running. The engine may be determined to be running if combustion is occurring in at least some of the cylinders, if the key or other ignition starter is in the on position, and/or the transmission is not in park. Further, even if an engine is undergoing deceleration fuel shut off, where fuel injection is ceased during a deceleration event or while the vehicle is coasting, the engine may considered to be running as the DFSO operation is transient and does not include a formal command or indication to shut down the engine. Likewise, in idle stop vehicles (also referred to as automatic start-stop vehicles) that are configured to be shut down while the vehicle is temporarily stopped, during an idle stop the engine may considered to be running as various actions on the part of the operator will automatically restart the engine and such an action does not include a formal command or indication to shut down the engine. The engine may be determined to be non-running if combustion is not occurring in any of the cylinders, if the key or other ignition starter is in an off position, if the transmission is in park, and/or of the controller has shut down the engine to propel the vehicle with a motor rather than the engine.

If the engine is determined to be running, method 300 proceeds to 306 to perform an engine-on regeneration routine, which will be discussed in more detail below with respect to FIG. 4. Briefly, the engine-on regeneration routine (also referred to as an engine running regeneration routine) includes determining if the particulate filter is to be regenerated based on the measured or estimated soot load of the particulate filter and if the filter is to be regenerated, adjusting engine operating parameters, such as fuel injection amount and/or timing and intake throttle position, to execute the regeneration. Method 300 then returns.

If the engine is not running, method 300 proceeds to 308 to perform an engine-off regeneration routine, which will be described in more detail below with respect to FIG. 5. During the engine-off regeneration routine (also referred to as the non-engine running regeneration routine), a particulate filter heater is activated to heat the particulate filter rather than relying on exhaust heat generated by the engine. To draw in air to sustain the combustion of the particulate filter, an air flow device may be activated and the intake throttle, EGR valve, and/or other engine system valves may be adjusted so that the air drawn by the air flow device is intake air form the intake system. Method 300 then returns.

Figure 4:
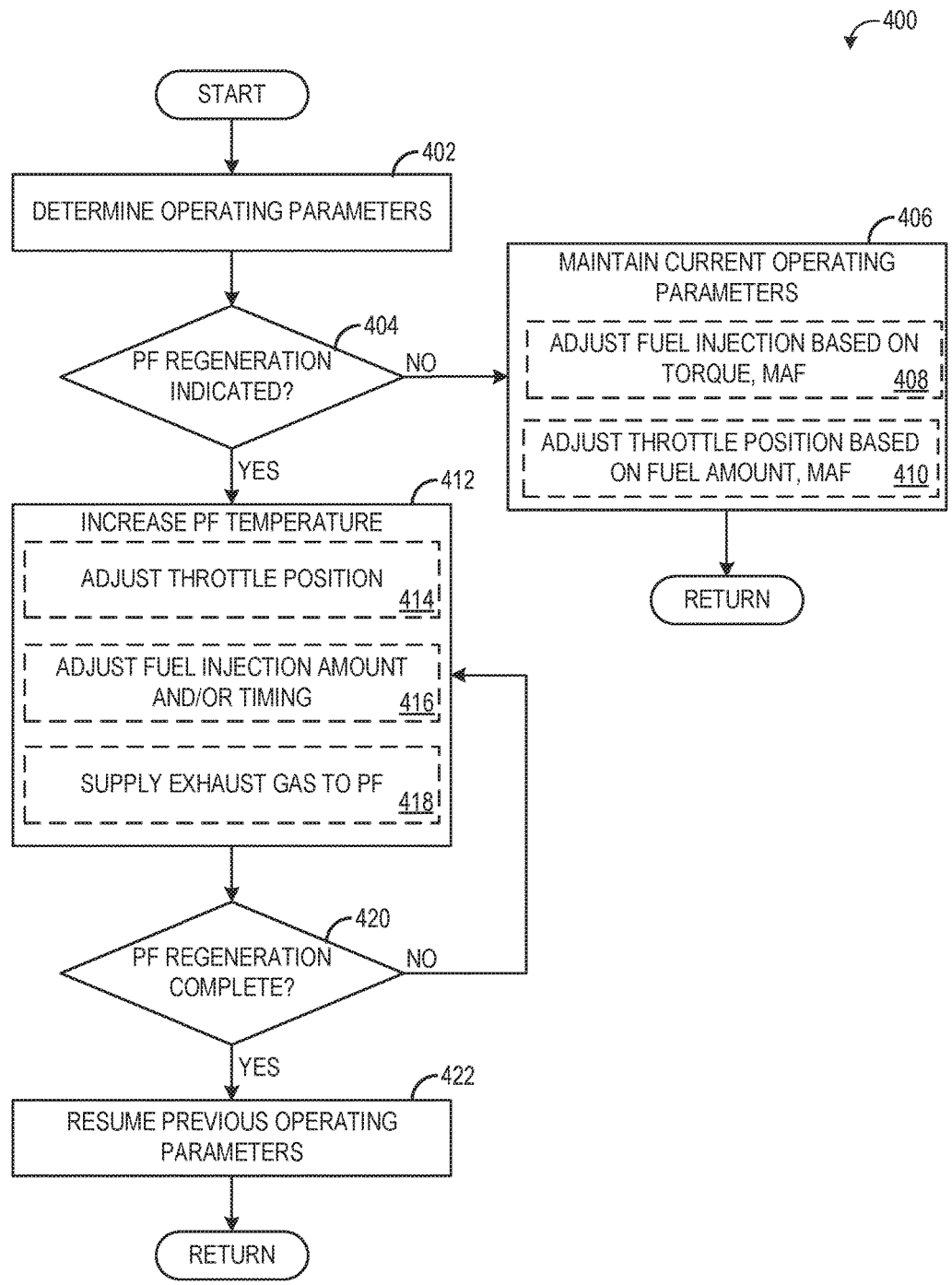
FIG. 4 is a flow chart illustrating an example method for performing an engine running regeneration routine.

FIG. 4 is a flow chart illustrating a method 400 for performing an engine-on regeneration routine. Method 400 may be performed as part of method 300 described above, for example in response to determination that the engine is running, or method 400 may be performed independently of method 300. At 402, method 400 includes determining operating parameters. The operating parameters determined may include particulate filter load, engine speed, vehicle speed, engine load, engine valve positions, fuel injection amount and timing, and other conditions. At 404, method 400 determines if particulate filter regeneration is indicated. Particulate filter regeneration may be indicated responsive to the load on the particulate filter exceeding a threshold load. The load may be measured by one or more sensors, such as one or more soot sensors positioned in the exhaust system. In other examples, the load may be estimated based on a pressure drop across the particulate filter, an amount of time since a previous regeneration was carried out, engine operation conditions over the operation of the engine since the previous regeneration was carried out, and/or other parameters. Further, in some examples if it is determined that the engine is likely to be shut down within a relative short amount of time (e.g., the vehicle has been put into park, the vehicle has reached a predetermined destination, etc.), even if the soot load is above the threshold, the regeneration may be delayed until the engine-off regeneration routine can be performed.

If it is determined that regeneration is not indicated, method 400 proceeds to 406 to maintain current operating parameters. The current operating parameters may include supplying fuel and intake air to the engine in amounts to meet operator-requested torque. As such, maintaining current operating parameters may include adjusting fuel injection parameters, such as fuel injection amount and/or timing, based on operator-requested torque and MAF, as indicated at 408. For example, the operator may signal to operate the vehicle at a desired speed by depressing the accelerator pedal and the controller may convert the pedal position to a torque request and inject an amount of fuel to meet the torque request. Further, the amount of fuel that is injected to the engine may be further determined according to the intake air mass flow, which may be measured by a MAF sensor, such as sensor 121, to ensure a target air-fuel ratio is reached, for example. Fuel injection amounts may be further determined based on exhaust air-fuel ratio as determined by an exhaust oxygen sensor, such as sensor 126. Maintaining current operating parameters may include adjusting the intake throttle position (e.g., intake throttle 62 of FIG. 2) based on the fuel injection amount, operator-requested torque, and/or MAF, as indicated at 410. In some examples, the intake throttle position may be controlled responsive to the operator-input pedal position rather than the fuel injection amount, and the fuel may be injected in an amount to meet commanded air-fuel ratio. Method 400 then returns.

If it is determined at 404 that particulate filter regeneration is indicated, method 400 proceeds to 412 to increase particulate filter temperature to perform the regeneration. Increasing the particulate filter temperature may include adjusting a position of the intake throttle, as indicated at 414. For example, the intake throttle may be moved to a more closed position, which may increase the temperature of the intake air and hence the exhaust gas that is provided to the particulate filter. Further, increasing the particulate filter temperature may include adjusting fuel injection amounts and/or timing, as indicated at 416. For example, additional fuel may be injected, fuel injection timing (or spark timing in some examples) may be retarded, and/or a post-injection event where additional fuel is injected after the main fuel injection may be performed to produce rich exhaust which may be combusted over catalysts in the exhaust to heat the particulate filter. Additionally, increasing the particulate filter temperature includes supplying exhaust gas to the particulate filter, as indicated at 418. In this way, hot and/or rich exhaust gas is supplied to the particulate filter, which causes combustion of the particulates/soot stored in the filter.

At 420, method 400 determines if the particulate filter regeneration is complete. The regeneration may be determined to be complete once the regeneration has been carried out for a predetermined amount of time. In other examples, the regeneration may be determined to be complete once the pressure drop across the particulate filter falls below a threshold, or other suitable determination that the soot has burned off the filter. If the regeneration is not complete, method 400 continues to maintain the increased particulate filter temperature at 412. If the particulate filter regeneration is complete, method 400 proceeds to 422 to resume prior (pre-regeneration) operating parameters, including opening the intake throttle valve, advancing fuel injection timing back to the default or previous timing, and maintaining air-fuel ratio at or above stoichiometry. Method 400 then returns.

Figure 5:
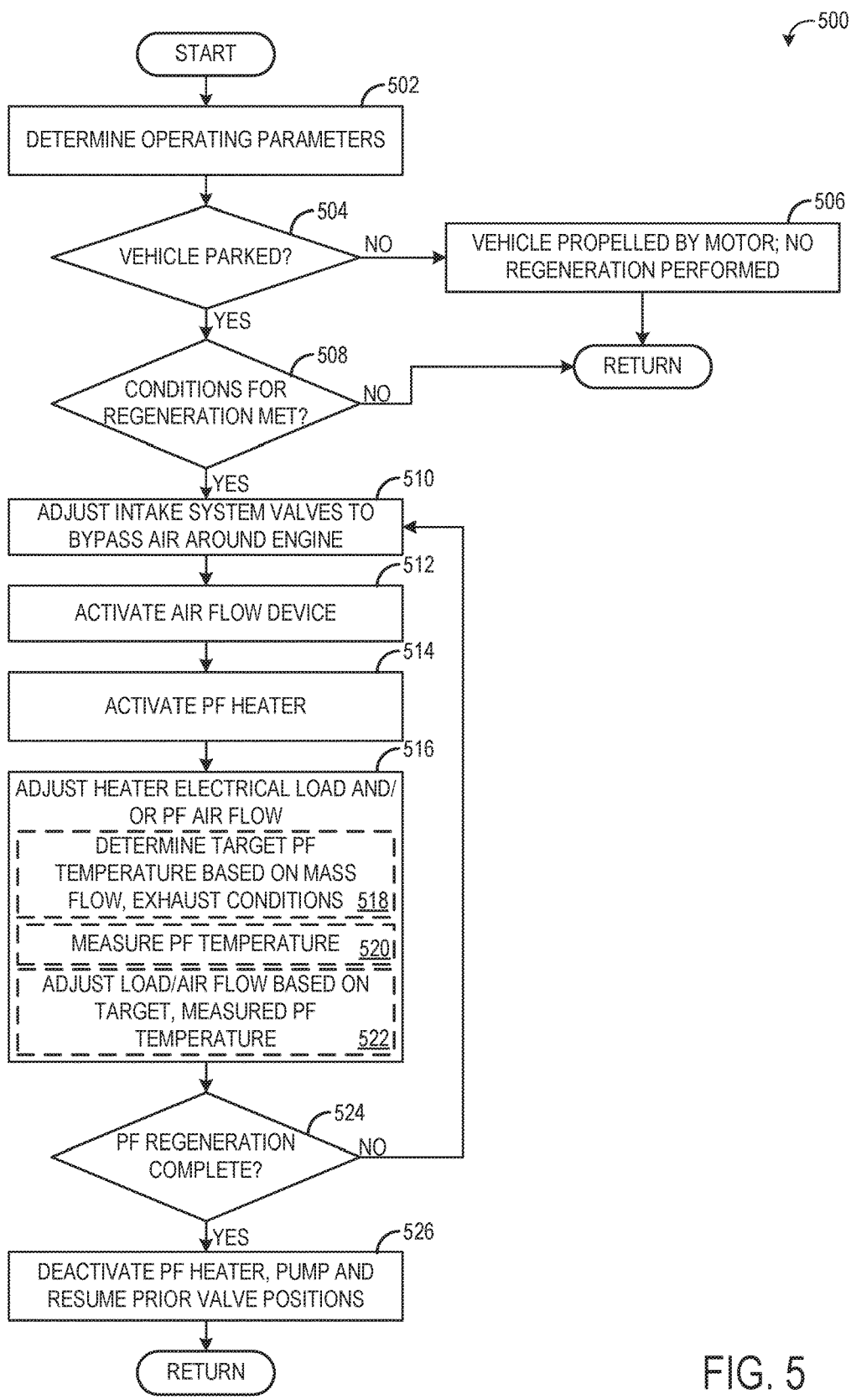
FIG. 5 is a flow chart illustrating an example method for performing a non-engine running regeneration routine.

FIG. 5 is a flow chart illustrating a method 500 for performing an engine-off particulate filter regeneration. Method 500 may be performed as part of method 300, for example in response to determining the engine is not running, or method 500 may be performed independently of method 300. At 502, method 500 determines operating parameters. The operating parameters determined at 502 may include vehicle status (e.g., transmission gear, speed), particulate filter status (e.g., a particulate filter load, time since a previous regeneration, etc.), and other parameters. At 504, method 500 determines if the vehicle is parked. A parked vehicle may include a vehicle speed of zero, the transmission gear being in park or neutral, and (as determined in method 300) the engine being off.

If the vehicle is not parked, for example if the vehicle is in drive, is moving, and/or is located on a road (as determined from GPS data, for example), method 500 proceeds to 506 to indicate that no particulate filter regeneration is to be performed, as the vehicle is being propelled by the motor. As such, the engine is not on, so an engine-on regeneration cannot be performed, but because the vehicle is moving (and hence not receiving power from a remote power source), the vehicle cannot perform the engine-off particulate filter regeneration. Method 500 then returns.

If the vehicle is parked, method 500 proceeds to 508 to determine if the conditions for regenerating the particulate filter have been met. The conditions for regenerating the filter may include the filter having a soot load above a threshold load in one example. The threshold load for performing a particulate filter regeneration when the engine is off may be lower than the threshold load for running a particulate filter regeneration when the engine is on. In this way, engine-off particulate filter regenerations may be performed more frequently than engine-on particulate filter regenerations, thus reducing the soot load on the particulate filter without incurring a fuel and emissions penalty. In another example, the conditions for regenerating the filter may include nearly all engine-off, vehicle parked conditions regardless of how much soot is stored on the filter. The conditions for regenerating the filter further include the particulate filter heater (e.g., heater 73) being coupled to a power source. For example, the heater may be plugged in to a residential power outlet or other power grid or power source.

If the conditions for regenerating the particulate filter are not met, method 500 returns. If the conditions are met, method 500 proceeds to 510 TO adjust one or more intake system and/or engine system valves to bypass intake air around the engine and to the exhaust system (and hence the particulate filter). The valves that may be adjusted include the intake throttle, which may be opened to allow fresh air passing through the air filter to be pulled into the intake system. Additionally, one or more EGR system valves may be opened, such as EGR valve 244 of FIG. 2. By opening the EGR valve, the fresh air in the intake system may be directed to the exhaust system, without traveling through the engine. If the EGR system includes an EGR cooler with a bypass, the bypass valve may be opened so that the fresh air does not have to travel through the cooler. Further, if possible, the cylinder intake valves and/or exhaust valves of the engine may be closed to prevent the flow of fresh air through the engine.

At 512, method 500 includes activating an air flow device, such as device 76 of FIG. 2. The air flow device may be a pump or a fan which may pull or push air/gas from the exhaust system through the particulate filter and out of the tailpipe to atmosphere. At 514, method 500 activates the particulate filter heater (e.g., heater 73). In one example, the heater may be activated automatically when plugged in to the power source. In other examples, the heater controller and/or engine controller may activate the heater by turning on a circuit switch or other action to allow the voltage from the power supply to be applied to the heater.

Thus, by activating the air flow device and opening the throttle and EGR valve, the device may suction fresh air in through the intake system and EGR system to the exhaust system and hence the particulate filter. This fresh air may sustain combustion of the soot particles on the filter that is initiated by the high temperature of the particulate filter created by the heater.

At 516, method 500 adjusts the heater electrical load and/or particulate filter air flow in order to maintain regeneration at a target temperature and/or soot burn rate. For example, the electrical load may initially be relatively high to bring the filter to a target temperature that initiates regeneration (e.g., 500° C.). However, once regeneration commences, the heat from the combustion of the soot particles may help maintain the particulate filter at the target temperature, and as such the electrical load of the heater may be reduced. The electrical load may be adjusted by the heater controller, for example by adjusting the switching frequency of the circuit switch or other suitable mechanism. The air flow may be adjusted to control the rate of soot combustion and/or maintain the particulate filter heater at the desired temperature. In one example, the electrical load of the heater may be maintained at a constant load, and the temperature and soot burn rate control in the particulate filter may be provided by adjusting the air flow mass and/or rate through the particulate filter. In another example, the air flow mass and/or rate through the particulate filter may be maintained at a constant mass and/or rate, and the temperature and soot burn rate control in the particulate filter may be provided by adjusting the electrical load of the heater. In a still further example, both the electrical load of the heater and the air flow mass and/or rate through the particulate filter may adjusted to maintain desired particulate filter temperature and soot burn rate.

Further, in some examples, the heater electrical load adjustment may be based on one or more measured parameters of the particulate filter and fresh air stream supplied to the particulate filter. As described above, the activation of the air flow device and opening of the throttle and EGR valve allows intake air to be provided to the exhaust system to sustain the combustion. In doing so, the fresh air in the intake system flow past various sensors, including but not limited to the mass air flow sensor (MAF sensor 121) and additional exhaust sensors, such as temperature or pressure sensors, soot sensors, etc. The output from the sensors may be used to determine the temperature of the particulate filter, the pressure drop across the filter, the soot burn rate, and a target temperature of the filter, among other parameters.

Accordingly, adjusting the heater electrical load and/or PF air flow may include determining a target PF temperature based on mass air flow, exhaust/fresh air conditions, and particulate filter load, as indicated at 518. For example, the PF load may be known by the controller at the onset of regeneration and the mass air flow may be measured by the MAF sensor at the start of the regeneration (e.g., once the air flow device is activated and the intake throttle and EGR valve are open). The exhaust/fresh air conditions may include ambient pressure and ambient temperature (as determined by ambient temperature and pressure sensors or by information from a remote service such as a GPS unit) and/or exhaust temperature and exhaust pressure, as measured by exhaust sensors. In one example, the mass air flow and ambient or exhaust pressure may be used to calculate the mass of air in the particulate filter and hence the oxygen amount of the particulate filter. The target temperature of the particulate filter may be stored in a look up table as a function of the soot load and air mass in one example, or the controller may make a logical determination (e.g., regarding the target temperature) based on logic rules that are a function of mass air flow/air mass and soot load. Further, the target temperature may be modified based on ambient temperature, e.g., if ambient temperature is high, the target temperature may be reduced.

Adjusting the electrical load may further include measuring the PF temperature, as indicated at 520, and then the electrical load may be adjusted based on the target and measured PF temperature, as indicated at 522. For example, the load may be increased if the measured temperature is lower than the target or the load may be decreased if the measured temperature is greater than the target.

In some examples, additionally or alternatively, the particulate filter air flow may be adjusted to help control the PF temperature and soot burn rate. The PF air flow adjustment may include adjusting a speed of the air flow device (e.g., pump speed), adjusting the EGR valve position, and/or adjusting the intake throttle position. In engine systems that include an exhaust throttle, the exhaust throttle position may be adjusted to adjust the PF air flow. Similar to the electrical load adjustment described above, the PF air flow adjustment may be made based on the difference between the target PF temperature and measured PF temperature, such that the air flow may be increased if the measured temperature is lower than the target or the air flow may be decreased if the measured temperature is greater than the target. In this way, the temperature of the PF may be controlled to be within a target range of temperatures that is a function of initial soot load, mass air flow, and air pressure.

At 524, method 500 determines if the particulate filter regeneration is complete. The PF regeneration may be determined to complete when the target temperature has been sustained for a predetermined amount of time. In another example, the PF regeneration may be determined to be complete when the pressure drop across the filter reaches a threshold level that indicates little or no soot is left on the filter. In a still further example, the PF regeneration may be determined to be complete when the temperature downstream of the filter drops below a threshold (e.g., the upstream exhaust temperature), indicating combustion of soot is complete. In a still further example, the PF regeneration may be determined to be complete when the oxygen concentration downstream of the particulate filter is equal to the oxygen concentration upstream of the particulate filter. In some examples, more than one parameter described above may be assessed to determine if the PF regeneration is complete, e.g., PF regeneration may be indicated to be complete if both the pressure drop across the filter is low and the downstream temperature or oxygen concentration is equal to the respective corresponding upstream temperature or oxygen concentration. If the PF regeneration is not complete, method 500 returns to 510 and continues to activate the heater, run the air flow device, keep the intake system valves open, and adjust the electrical load of the heater.

If the regeneration is complete, method 500 proceeds to 526 to deactivate the PF heater. The filter will begin to cool down; however, the air flow device may remain activate for a duration, with the intake system valves open, to continue supply fresh air through the filter. This will allow the filter to cool down to a sufficient temperature so that degradation of the filter does not occur. Once the filter is cool, the air flow device is deactivated and the valves are returned to their default positions. Method 500 then returns.

Thus, method 500 regenerates a particulate filer during an engine-off, vehicle parked condition by activating a heater of the particulate filter and supplying fresh air to the filter from the intake system. The sensors in the vehicle may be leveraged to monitor PF regeneration conditions to ensure the filter is kept at a target temperature, reducing the likelihood an overtemperature event may occur. For example, as explained above, the mass of air in the particulate filter during the regeneration may be determined by the intake air mass flow, as measured by the MAF sensor, for example, along with ambient or exhaust pressure. The air mass in the filter and the initial soot load may then be used to determine a target temperature to which the filter is controlled.

In some examples, even further engine system sensors may be used to monitor the regeneration. In one example, the exhaust oxygen sensor(s) output may be sampled and analyzed to determine the direction of the air flow through the exhaust system during the regeneration. For example, if the air is flowing in the proper direction (e.g., from the intake system to the filter), the exhaust sensor positioned between the engine and the filter (also referred to as the upstream sensor) will output a signal indicative of a high oxygen concentration while an exhaust sensor downstream of the filter will output a signal indicative of a lower oxygen concentration, owing to combustion of the oxygen in the filter. If the results are reversed (e.g., the upstream sensor detects a low oxygen concentration), it may indicate degradation of the system (e.g., degraded pump, intake valves failing to open, etc.), at which time the regeneration may be terminated and a notification output to an operator.

The technical effect of performing an engine-off particulate filter regeneration is reduced fuel consumption and improved emissions. This is due to the regenerations being carried out when the engine is not running and thus no fuel is used by the engine during the regeneration. Further, by not performing regenerations during engine running conditions (or only performing the regenerations during engine running when exhaust backpressure reaches an upper threshold limit and the engine is not expected to be shut down soon), the compromise in NOx reduction that is typically observed during regeneration may be avoided.

The approach described herein may be particularly suited for a fleet of vehicles that may be operated in a more controlled and regulated setting than standard individual automobiles. For example, the fleet may be parked in the same building each night, and each vehicle of the fleet may have a particulate filter as described herein that can be plugged in to perform a regeneration. Once parked, an operator may plug in each vehicle of the fleet and perform a regeneration after each day of operation of the vehicles. By doing so, sufficient regeneration may be performed and exhaust backpressure may be lowered overall, further increasing fuel economy. Additionally, because the regenerations may be carried out in a building where the hot exhaust gas may be vented in a controlled manner, component or personal injury that may result from exposure to hot exhaust gas (as may happen during a standard, engine-on PF regeneration) may be avoided.

An example of a method includes, during a non-engine operating condition, regenerating a particulate filter coupled in an exhaust system downstream of an engine by activating an electric heater of the particulate filter and directing intake air through the particulate filter, the intake air bypassing the engine; and adjusting an electrical load of the electric heater responsive to one or more of exhaust temperature and intake airflow. In a first example of the method, the non-engine operating condition comprises the engine being shut down and a vehicle in which the engine is installed not moving. In a second example of the method, which optionally includes the first example, activating the electric heater comprises supply current to the electric heater from a voltage source positioned external to the vehicle. In a third example of the method, which optionally includes one or both of the first example and second example, directing intake air through the particulate filter comprises opening one or more intake air flow valves of an intake system coupled to the engine and activating an air flow device positioned in the exhaust system or in an intake system coupled to the engine. In a fourth example of the method, which optionally includes one or more or each of the first through third examples, opening the one or more intake air flow valves of the intake system comprises opening one or more of an intake throttle valve, an exhaust gas recirculation (EGR) valve, and an EGR cooler bypass valve. In a fifth example of the method, which optionally includes one or more or each of the first through fourth examples, the opening of the one or more intake air flow valves and the activating of the air flow device causes intake air to flow past an intake mass flow sensor, and wherein adjusting the electrical load of the electric heater responsive to one or more of exhaust temperature and intake airflow comprises: determining a target particulate filter temperature based on output from the intake mass flow sensor, and further based on one or more of a particulate filter load, an ambient air temperature, and an ambient air pressure; and adjusting the electric load of the electric heater based on the target particulate filter temperature and exhaust temperature. In a sixth example of the method, which optionally includes one or more or each of the first through fifth examples, the method further comprises adjusting an air flow amount through the particulate filter based on the target particulate filter temperature and exhaust temperature.

An example of a system includes a particulate filter configured to be positioned in an exhaust system of an engine; an electric heater coupled to the particulate filter; an electrical coupling configured to electrically couple the electric heater to an external power supply; and a heater controller operably couplable to an engine controller, the heater controller storing non-transitory instructions executable to, responsive to an indication to regenerate the particulate filter, supply current to the electric heater by electrically coupling the electric heater to the external power supply via the electrical coupling; send a command to open one or more intake air flow valves and activate an electric pump configured to be coupled in the exhaust system; and adjust an amount of current supplied to the electric heater responsive to a received indication of intake air flow and particulate filter temperature. In a first example of the system, the indication to regenerate the particulate filter, the indication of the intake air flow, and the indication of the particulate filter temperature are each received from the engine controller. In a second example of the system, which optionally includes the first example, the command to open the one or more intake air flow valves is sent to the engine controller. In a third example of the system, which optionally includes one or both of the first and second examples, the electrical coupling is also configured to couple the external power supply to a vehicle battery. In a fourth example of the system, which optionally includes one or more or each of the first through third examples, the vehicle battery is coupled to a motor, the motor coupled to a vehicle driveline.

Another example of a method includes, during a first condition where an engine is operating, adjusting an engine fuel injection amount based on a sensed parameter, the sensed parameter sensed by an engine system sensor; and during a second condition where the engine is not operating, adjusting one or more of an air flow through a particulate filter and an electric load of an electric heater coupled to the particulate filter based on the sensed parameter. In a first example of the method, adjusting the engine fuel injection amount and adjusting one or more of the air flow through the particulate filter and the electric load of the electric heater based on the sensed parameter comprises adjusting the engine fuel injection amount and adjusting one or more of the air flow through the particulate filter and the electric load of the electric heater based on sensed intake air mass flow, the sensed intake air mass flow sensed by an engine intake air mass flow sensor. In a second example of the method, which optionally includes the first example, the second condition further includes a command to perform a particulate filter regeneration responsive to a load of the particulate filter exceeding a threshold load, and the method further comprises, during the second condition, actuating one or more intake air flow valves of an intake system coupled to the engine, activating an intake or exhaust air flow device to draw air past the engine intake air mass flow sensor and to the particulate filter, and activating the electric heater to perform the particulate filter regeneration. In a third example of the method, which optionally includes one or both of the first and second examples, adjusting one or more of the air flow through the particulate filter and the electric load of the electric heater based on the sensed intake air mass flow comprises determining a target particulate filter temperature as a function of the sensed intake air mass flow and adjusting the electric load to reach the target particulate filter temperature. In a fourth example of the method, which optionally includes one or more or each of the first through third examples, adjusting one or more of the air flow through the particulate filter and the electric load of the electric heater based on the sensed intake air mass flow comprises determining a target particulate filter temperature as a function of the sensed intake air mass flow and adjusting the air flow through the particulate filter to reach the target particulate filter temperature. In a fifth example of the method, which optionally includes one or more or each of the first through fourth examples, adjusting the air flow through the particulate filter comprises one or more of adjusting a position of one or more of the intake air flow valves and adjusting a speed of the intake or exhaust air flow device. In a sixth example of the method, which optionally includes one or more or each of the first through fifth examples, the method further comprises deactivating the electric heater responsive to an exhaust temperature or exhaust oxygen concentration measured downstream of the particulate filter being equal to an exhaust temperature or exhaust oxygen concentration measured upstream of the particulate filter. In a seventh example of the method, which optionally includes one or more or each of the first through sixth examples, adjusting the engine fuel injection amount based on the sensed intake air mass flow comprises increasing the engine fuel injection amount as the sensed intake air mass flow increases.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   during a non-engine operating condition, regenerating a particulate filter coupled in an exhaust system downstream of an engine by activating an electric heater of the particulate filter and directing intake air from an intake system of the engine through the particulate filter via a controller, the intake air bypassing the engine;
   determining a target particulate filter temperature during the regenerating based on output from an intake air mass flow sensor via the controller; and
   adjusting an electrical load of the electric heater during the regenerating based on the output from the intake air mass flow sensor via the controller.

2. The method of claim 1, wherein the non-engine operating condition comprises the engine being shut down and a vehicle in which the engine is installed not moving.

3. The method of claim 2, wherein activating the electric heater comprises supplying current to the electric heater from a voltage source positioned external to the vehicle.

4. The method of claim 1, wherein directing intake air through the particulate filter comprises opening one or more intake air flow valves of an intake system coupled to the engine and activating an air flow device positioned in the exhaust system or in the intake system coupled to the engine.

5. The method of claim 4, wherein opening the one or more intake air flow valves of the intake system comprises opening one or more of an intake throttle valve, an exhaust gas recirculation (EGR) valve, and an EGR cooler bypass valve.

6. The method of claim 4, wherein:
   the opening of the one or more intake air flow valves and the activating of the air flow device causes intake air to flow past the intake air mass flow sensor;
   the determining the target particulate filter temperature is further based on one or more of a particulate filter load, an ambient air temperature, and an ambient air pressure; and
   the adjusting the electrical load of the electric heater is further based on the target particulate filter temperature and an exhaust temperature.

7. The method of claim 6, further comprising adjusting an intake air flow amount through the particulate filter based on the target particulate filter temperature and the exhaust temperature.

8. A method, comprising:
   during a first condition where an engine is operating, adjusting an engine fuel injection amount based on at least a sensed intake air mass flow via a controller, the sensed intake air mass flow sensed by an engine intake air mass flow sensor; and
   during a second condition where the engine is not operating, adjusting one or more of an intake air flow through a particulate filter located in an exhaust system and an electrical load of an electric heater coupled to the particulate filter via the controller based on at least the sensed intake air mass flow, wherein adjusting one or more of the intake air flow through the particulate filter and the electrical load of the electric heater based on the sensed intake air mass flow comprises determining a target particulate filter temperature as a function of the sensed intake air mass flow and adjusting the electrical load of the electric heater to reach the target particulate filter temperature.

9. The method of claim 8, wherein the second condition further includes a command to perform a particulate filter regeneration responsive to a load of the particulate filter exceeding a threshold load, and further comprising, during the second condition, actuating one or more intake air flow valves of an intake system coupled to the engine, activating an intake or exhaust air flow device to draw air past the engine intake air mass flow sensor and to the particulate filter, and activating the electric heater to perform the particulate filter regeneration.

10. The method of claim 8, wherein adjusting one or more of the intake air flow through the particulate filter and the electrical load of the electric heater based on the sensed intake air mass flow comprises adjusting the intake air flow through the particulate filter to reach the target particulate filter temperature.

11. The method of claim 10, wherein adjusting the air flow through the particulate filter comprises one or more of adjusting a position of one or more of the one or more intake air flow valves and adjusting a speed of the intake or exhaust air flow device.

12. The method of claim 9, further comprising deactivating the electric heater responsive to an exhaust temperature or an exhaust oxygen concentration measured downstream of the particulate filter being equal to an exhaust temperature or an exhaust oxygen concentration measured upstream of the particulate filter.

13. The method of claim 8, wherein adjusting the engine fuel injection amount based on the sensed intake air mass flow comprises increasing the engine fuel injection amount as the sensed intake air mass flow increases.

14. A method, comprising:
   during an engine operating condition, flowing intake air past a mass airflow sensor to an engine and adjusting at least one engine operating parameter based on an output of the mass airflow sensor via a controller; and
   during a non-engine operating condition, regenerating a particulate filter coupled in an exhaust system downstream of the engine by flowing the intake air past the mass airflow sensor and through the particulate filter via the controller, the intake air bypassing the engine, while adjusting an electrical load of an electric heater coupled to the particulate filter based on the output of the mass airflow sensor.

15. The method of claim 14, wherein flowing the intake air past the mass airflow sensor and through the particulate filter includes opening one or more intake air flow valves of an intake system coupled to the engine and activating an intake or exhaust air flow device to draw the intake air from upstream of the mass airflow sensor, past the mass airflow sensor, and to the particulate filter.

16. The method of claim 15, further comprising: during the regenerating of the particulate filter, adjusting an intake air flow through the particulate filter based on the output of the mass airflow sensor.

17. The method of claim 14, further comprising:
during the non-engine operating condition, determining a target particulate filter temperature based on the output from the intake mass airflow sensor via the controller, and further based on one or more of a particulate filter load, an ambient air temperature, and an ambient air pressure; and
further adjusting the electrical load of the electric heater based on the target particulate filter temperature and an exhaust temperature via the controller.

18. The method of claim 14, wherein the regenerating the particulate filter is responsive to a load of the particulate filter exceeding a threshold load.

\* \* \* \* \*